United States Patent
Snethen et al.

(10) Patent No.: US 11,426,664 B1
(45) Date of Patent: Aug. 30, 2022

(54) DYNAMIC DESTRUCTION OF GAME OBJECTS

(71) Applicant: Square Enix Ltd., London (GB)

(72) Inventors: Gary Linn Snethen, Fremont, CA (US); Konstantin Khitrin, Pacifica, CA (US); Dharmik Dave, San Jose, CA (US); Kevin Do, Bellevue, WA (US); Mike Oliver, San Jose, CA (US)

(73) Assignee: Square Enix Ltd., London (GB)

( * ) Notice: Subject to any disclaimer, the term of this patent is extended or adjusted under 35 U.S.C. 154(b) by 0 days.

(21) Appl. No.: 17/229,599

(22) Filed: Apr. 13, 2021

(51) Int. Cl.
*A63F 13/00* (2014.01)
*A63F 13/69* (2014.01)
*A63F 13/79* (2014.01)
*A63F 13/77* (2014.01)

(52) U.S. Cl.
CPC .............. *A63F 13/69* (2014.09); *A63F 13/77* (2014.09); *A63F 13/79* (2014.09); *A63F 2300/6009* (2013.01)

(58) Field of Classification Search
CPC .................................. A63F 13/69; A63F 13/77
See application file for complete search history.

(56) References Cited

U.S. PATENT DOCUMENTS

2007/0218965 A1* 9/2007 Tilston ................ A63F 13/5378
463/2
2008/0149832 A1* 6/2008 Zorn .................... G01Q 10/045
250/311
2019/0388786 A1* 12/2019 D'angelo ................ A63F 13/42

OTHER PUBLICATIONS

GTA 5 car crashes https://youtu.be/dtW8h727ne0 (Year: 2020).*

* cited by examiner

*Primary Examiner* — Omkar A Deodhar
*Assistant Examiner* — Eric M Thomas
(74) *Attorney, Agent, or Firm* — Fenwick & West LLP

(57) ABSTRACT

Embodiments relate to providing dynamic destruction of a game object displayed in an electronic game. During a gameplay session, a determination is made that the game object has been damaged. Responsive to the determination that the game object has been damaged, a level of destructive detail is determined. A destruction object having the determined level of destructive detail is created. Using the destruction object, a graphical indication of the damage of the game object is rendered.

18 Claims, 4 Drawing Sheets

400

Determine that a game object has been damaged
410

Responsive to determination that the game object has been damaged, determine a level of destructive detail
420

Create a destruction object having the determined level of destructive detail
430

Render a graphical indication of the damage of the game object
440

FIG. 4

DYNAMIC DESTRUCTION OF GAME OBJECTS

BACKGROUND

The present disclosure generally relates to electronic games, and in particular to dynamically rendering destruction objects generated when game objects are damaged in a session of an electronic game.

Many electronic games provide gameplay sessions, which are instances of gameplay. During gameplay sessions, many game objects are rendered, such as graphical elements representing enemies. Often, during a gameplay session, game objects are damaged or destroyed in the course of gameplay. Simulating and rendering a detailed depiction of the damage caused to a game object can increase player immersion but may also involve the use of a large amount of computing resources, such as random-access memory and processor cycles. This may cause a myriad of issues, such as low frame rate, lag, or the crashing of the electronic game.

SUMMARY

Embodiments relate to providing dynamic destruction of a game object displayed in an electronic game. During a gameplay session, a determination is made that the game object has been damaged. Responsive to the determination that the game object has been damaged, a level of destructive detail is determined. A destruction object having the determined level of destructive detail is created. Using the destruction object, a graphical indication of the damage of the game object is rendered.

In one or more embodiments, the level of destructive detail is based on one or more properties of the game object. For example, the one or more properties of the game object may include an indication of whether the one or more destruction objects should have a mesh assignment or a gravity assignment.

In one or more embodiments, a client device provides dynamic destruction of the game object, where the level of destructive detail is based on one or more properties of the client device. For example, the one or more properties of the client device may include a type of client device, a type of operating system, a type of processor, a current processor usage percentage, a type of memory, an amount of currently available memory, and an amount of memory currently being used.

In one or more embodiments, the level of destructive detail is based on one more properties of the gameplay session. For example, the one or more properties of the gameplay session may include a type of game, a type of scene, a number of game objects in the scene, and a frame rate of the scene.

In one or more embodiments, a client device provides dynamic destruction of the game object, where the level of destructive detail is based on one or more settings provided by a user of the client device.

In one or more embodiments, the level of destructive detail is one of two levels of destructive detail, where a first level of destructive detail defines a physics-based configuration of the destruction object and a second level of destructive detail defines an effects-based configuration of the destruction object.

In one or more embodiments, during the gameplay session, a plurality of other game objects is rendered. An amount of the plurality of other game objects that are being rendered with a physics-based configuration is determined. The amount of the plurality of other game objects is compared to a threshold amount. Based on the amount of the plurality of other game objects being greater than the threshold amount, the level of destructive detail is updated to the second level of destructive detail.

In one or more embodiments, the destruction object represents debris caused by damage to the game object. During the gameplay session, one or more other game objects are rendered, where the level of destructive detail determines whether an interaction takes place between the destruction object and the one or more other game objects. In one or more embodiments, a first level of destructive detail for the destruction object provides for an interaction between the destruction object and any of the one or more other game objects, and a second level of destructive detail for the destruction object does not provide for an interaction with any of the one or more other game objects.

In one or more embodiments, the level of destructive detail is determined by a metric that indicates an available amount of computing resources at a time the game object is damaged. The metric is based on at least one of a current processor usage percentage, an amount of currently available memory, or a current frame rate. The metric is compared to a threshold metric. Based on the metric being greater than the threshold metric, the first level of destructive detail is selected.

BRIEF DESCRIPTION OF DRAWINGS

FIG. 4 is a flowchart illustrating a process for providing dynamic destruction of a game object, according to an embodiment.

Figure 1:
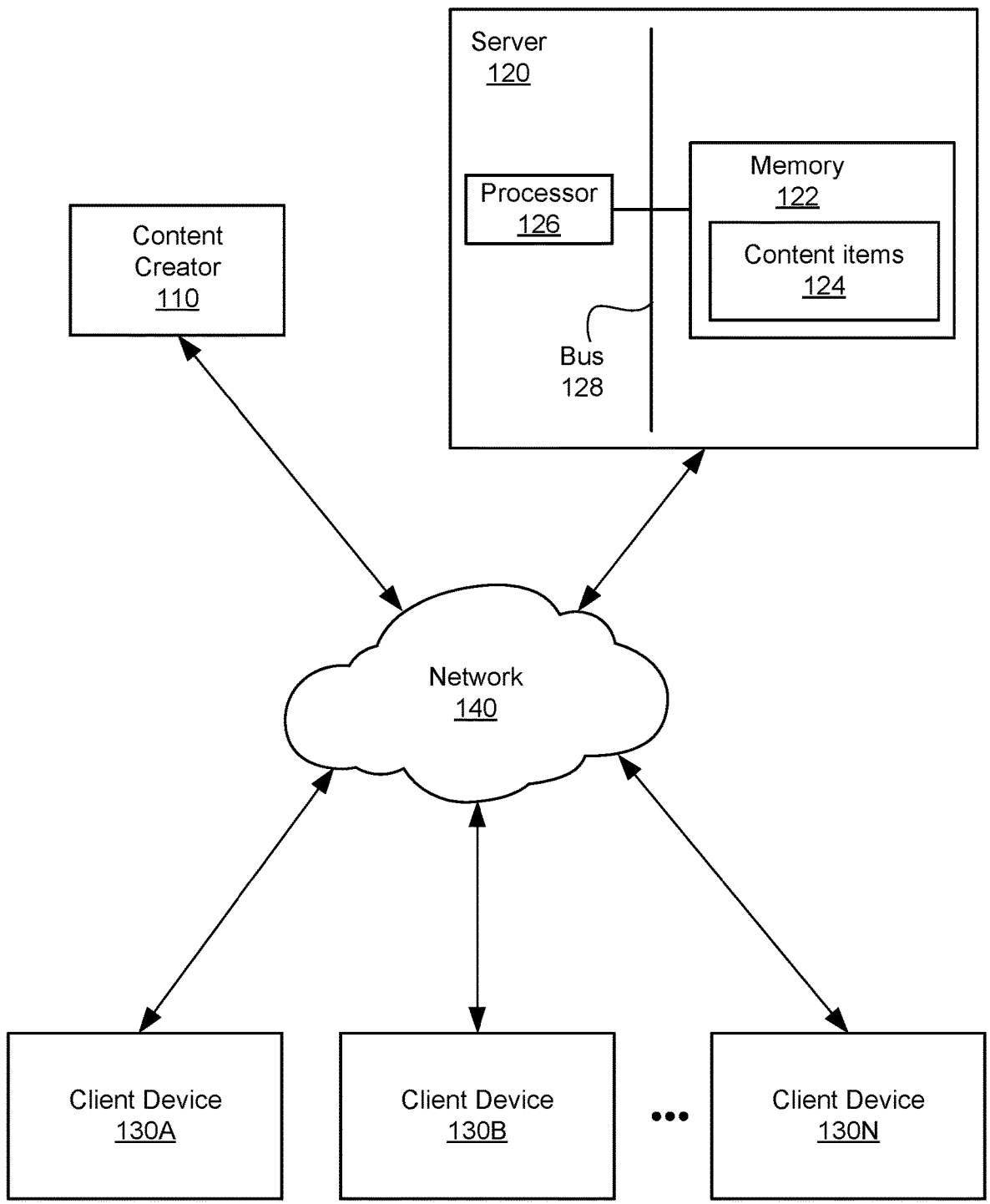
FIG. 1 is a block diagram of a computer game system, according to an embodiment.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to providing dynamic destruction of game objects in a gameplay session. A gameplay session is an instance of gameplay of an electronic game. The gameplay session may be played upon a client device. For example, the electronic game may be a video game that is run on a client device, such as a computer or a game console. Users may participate in the gameplay session via the client device. The client device may receive input from a user indicating a gameplay actions within the gameplay session, which may cause destruction (e.g., damage) to a game object. In other embodiments, the destruction of a game object may be initiated by other factors other than received user input. For example, a game object may be destroyed based on actions by a non-player character (NPC) controlled by the electronic game, or based on scripted events included in the electronic game.

Game objects are data objects included in a gameplay session for display or interaction. For example, a game object may represent a building, and another game object may represent a character (e.g., an enemy, a comrade, etc.), and yet another game object may represent a collectable item (e.g., a helmet, a piece of armor, a weapon, a potion, a power up, etc.).

The game objects may experience damage within the gameplay session. For example, a game object experiences damage when a destructive action (e.g., being shot, blown up, hit, etc.) occurs upon the game object within a gameplay session including the game object. As such, one or more destruction objects may be instantiated to represent the damage to the game object. The destruction objects may replace the game object or be instantiated in addition to the original game object. A destruction object may represent debris caused by the damage to the game object. For example, a helmet (a game object) struck with a sword (damage) breaks in half, resulting in the helmet being replaced by two destruction objects representing the two halves of the damaged helmet. As another example, a robot (a game object) may be shot (damage) resulting in a component (e.g., a mechanical arm) being blown off. A destruction object may be instantiated for the removed component while the original game object representing the robot remains (possibly with its appearance altered to reflect the missing component).

After determining the game object has been damaged (e.g., shot, blown up, etc.) in a gameplay session, a level of destructive detail is determined. The determined level of destructive detail may be based on one or more properties of the game object, one or more properties of a client device displaying the gameplay session, one or more properties of the gameplay session, or one or more settings provided by the user of the client device. One or more properties of the game object may include an indication of whether the destruction object should include a mesh assignment or a gravity assignment. One or more properties of the client device may include a type of client device, a type of operating system, a type of processor, a current processor usage percentage, a type of memory, an amount of currently available memory, and an amount of memory currently being used. One or more properties of the gameplay session may include a type of game, a type of scene, a number of game objects in the scene, and a frame rate of the scene.

The level of destructive detail affects the creation and rendering of the one or more destruction objects resulting from the damage to the game object. In one embodiment, each of the destruction objects is created with either a first or second level of destructive detail. Objects with the first level of destructive detail are physics objects that interact with other objects in the environment with simulated physics. For example, using the first level of destructive detail for a destruction object, a graphical indication of the damage of the game object is rendered as a rigid body. Objects with the second level of destructive detail are effects objects that are rendered within the environment but generally do not interact with other objects. For example, with the second level of destructive detail, a destruction object is rendered and behaves in a predetermined manner (e.g., follows a predetermined path) in the game environment, regardless of what other objects are present. With the first level of destructive detail, the damage of the game object may act and appear more visually realistic to the user, but it also consumes a greater amount of computing resources. Depending on an amount of physics objects currently being rendered in the scene, the level of destructive detail for a destruction object may be updated.

Among other advantages, dynamic destruction of a game object in a gameplay session, enables real-time decision making as to what level of destructive detail a damaged game object (and its corresponding destruction objects) are created and rendered (e.g., with a physics-based configuration or an effects-based configuration) while preventing performance issues, such as low frame rate, lag, or crashing of the electronic game. Thus, dynamic destruction of the game object improves performance of the client device.

Embodiments are described herein with reference to the figures where like reference numbers indicate identical or functionally similar elements. Also, in the figures, the left most digit or digits of each reference number corresponds to the figure in which the reference number is first used.

FIG. 1 is a block diagram of a computer game system 100 in which the techniques described herein may be practiced, according to an embodiment. The system 100 includes, among other components, a content creator 110, a server 120, client devices 130, and a network 140. In other embodiments, the system 100 may include additional content creators 110 or servers 120, or may include a singular client device 130.

The content creator 110, the server 120, and the client devices 130 are configured to communicate via the network 140. The network 140 includes any combination of local area or wide area networks, using both wired or wireless communication systems. In one embodiment, the network 140 uses standard communications technologies or protocols. For example, the network 140 includes communication links using technologies such as Ethernet, 802.11, world-wide interoperability for microwave access (WiMAX), 3G, 4G, code division multiple access (CDESTRUCTION MANAGER 320A), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The content creator 110 is a computing device, such as a personal computer, a mobile phone, a tablet, or so on, which enables a game developer to create content items (e.g., characters and environment information) for a computer game. For this purpose, the content creator 110 includes a processor and a memory (not shown) that stores various software modules for creating content items. The created content items are sent to the server 120 for storing on its memory 122.

The server 120 is a computing device that includes a processor 126 and a memory 122 connected by a bus 128. The memory 122 includes various executable code modules or non-executable content items 124. The server 120 may receive and route messages between the content creator 110 and the client devices 130. Content items 124 may be sent to the client devices 130 via the network 140.

The processor 126 is capable of executing instructions, sequential or otherwise, that specify operations to be taken, such as performance of some or all of the techniques described herein. The bus 128 connects the processor 126 to the memory 122, enabling data transfer from the one to the other and vice versa. Depending upon the embodiments, the server 120 may include additional elements conventional to computing devices.

Each client device 130 is a computing device that includes a game or other software. The client device 130 receives data objects from the server 120 and uses the data objects to render graphical representations of characters and environment in which the characters take actions in the game. Different client devices 130 can request different data objects from the server 120.

Although the embodiment of FIG. 1 is described as operating in a networked environment, in other embodiments, the client devices 130 are not connected via a network and the computer game is executed without exchanging messages or content items over any network. In such cases, any content items associated with the compute game may be received and installed on the client devices 130 using a non-transitory computer readable medium such as DVD ROM, CD ROM, or flash drive.

Figure 2:
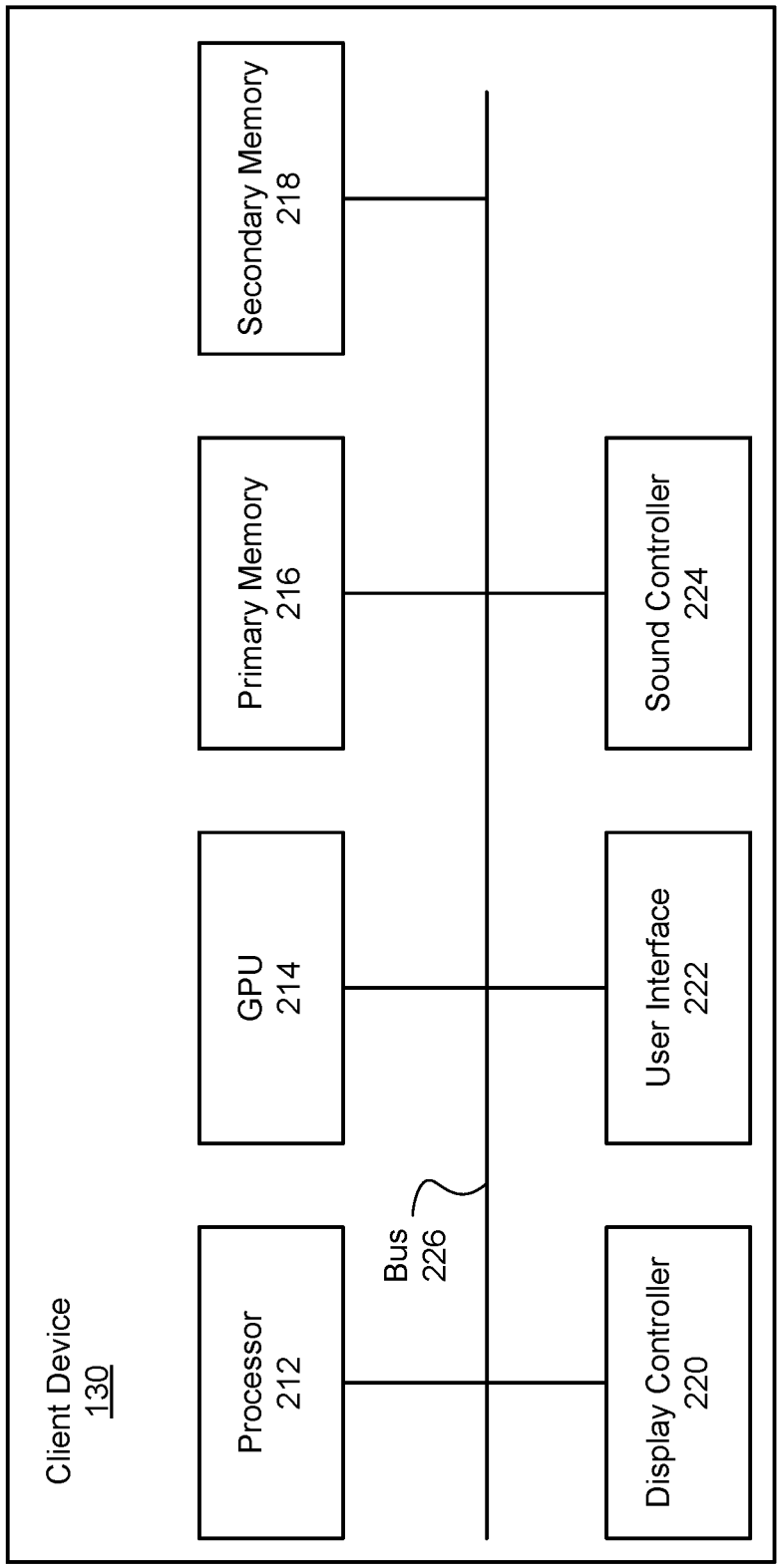
FIG. 2 is a block diagram of the client device of FIG. 1, according to an embodiment.

FIG. 2 is a block diagram of a client device 130 in which the techniques described herein may be practiced, according to an embodiment. The client device 130 is any machine capable of executing instructions, and may be a standalone device or a connected (e.g., networked) set of devices, and may be a computing device such as a gaming system, a personal computer, a mobile phone, a tablet, or so on. The client device 130 includes a processor (CPU) 212, a graphics processing unit (GPU) 214, a primary memory 216, a secondary memory 218, a display controller 220, a user interface 222, a sound controller 224, and a bus 226. In other embodiments the client device 130 may include additional or other components. While only a single client device 130 is illustrated, other embodiments may include any collection of client devices 130 that individually or jointly execute instructions to perform any one or more of the methodologies discussed herein.

The primary memory 216 is a machine-readable medium that stores instructions (e.g., software) embodying any one or more of the methodologies or functions described herein. For example, the primary memory 216 may store instructions that, when executed by the CPU 212, configure the CPU 212 to perform a process, described below in detail with reference to FIG. 4. Instructions may also reside, partially or completely, within the CPU 212 or GPU 214, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 218 is a memory separate from the primary memory 216. Similar to the primary memory 216, the secondary memory 218 is a machine-readable medium that stores instructions (e.g., software) embodying any one or more of the methodologies or functions described herein. For example, the primary memory 216 may be a hard drive of the client device 130, and the secondary memory 218 may be a game disc for an electronic game. As a specific example, the primary memory 216 may store a game system 300 that uses data stored on the secondary memory 218. Primary memory 216 and secondary memory 218 are described in greater detail with reference to FIG. 3 below.

The CPU 212 is processing circuitry configured to carry out the instructions stored in the primary memory 216 or secondary memory 218. The CPU 212 may be a general-purpose or embedded processor using any of a variety of instruction set architectures (ISAs). Although a single CPU is illustrated in FIG. 2, the client device 130 may include multiple CPUs 212. In multiprocessor systems, each of the CPUs 212 may commonly, but not necessarily, implement the same ISA.

The GPU 214 is a processing circuit specifically designed for efficient processing of graphical images. The GPU 214 may render objects to be displayed into a frame buffer (e.g., one that includes pixel data for an entire frame) based on instructions from the CPU 212. The GPU 214 may include one or more graphics processors that may execute graphics software to perform a part or all of the graphics operations.

The display controller 220 is a circuit that generates a video signal using graphical data from the GPU 214. For example, the display controller 220 drives a display device (e.g., a liquid crystal display (LCD) and a projector). As such, an electronic game can be displayed as images or a video sequence through the display controller 220.

The sound controller 224 is a circuit that provides input and output of audio signals to and from the client device 1130. For purposes of the destruction of game objects, the sound controller 224 can provide audio signals that align with the destruction.

The user interface 222 is hardware, software, firmware, or a combination thereof that enables a user to interact with the client device 130. The user interface 222 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a gameplay session that includes game objects rendered by the client device 130. The gameplay session includes a simulation and rendering of game objects, within which the user's game character operates. For example, the user's game character may destroy game objects during the gameplay session.

The client device 130 executes computer program modules for providing functionality described herein. As used herein, the term "module" refers to computer program instructions or other logic used to provide the specified functionality. Thus, a module can be implemented in hardware, firmware, or software. In some embodiments, program modules formed of executable computer program instructions are loaded into memory and executed by the CPU 212 or the GPU 214. For example, program instructions for the process of FIG. 4 can be loaded into the primary memory 216 or secondary memory 218, and executed by the CPU 212 and GPU 214.

Figure 3:
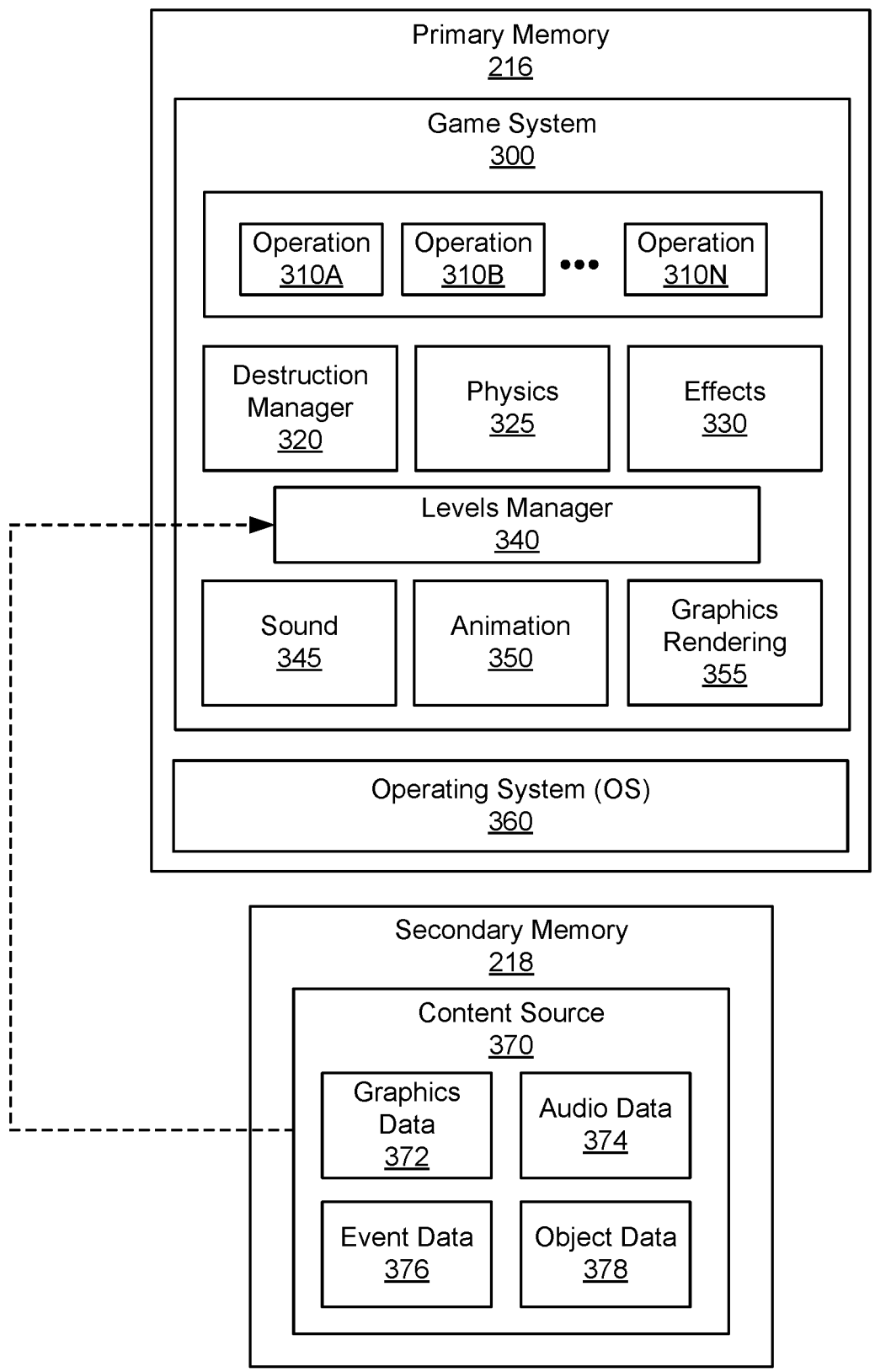
FIG. 3 is a block diagram of software modules in memory of the client device of FIG. 1, according to an embodiment.

FIG. 3 is a block diagram of software modules in memory of the client device 130 of FIG. 1, according to an embodiment. In particular, FIG. 3 illustrates software modules in the primary memory 216 and the secondary memory 218 of the client device 130. The primary memory 216 may store, among other modules, a game system 300 and an operating system ("OS") 360. The secondary memory 218 may store, among other modules, a content source 370. The primary memory 216 and secondary memory 218 may include other modules not illustrated in FIG. 3. Furthermore, in other embodiments, the primary memory 216 and secondary memory 218 may each store software modules and data represented herein as stored in the other.

The game system 300 includes a destruction manager 320, a physics system 325, an effects system 330, a level manager 340, a sound module 345, an animation system 350, and a graphics rendering module 355. These modules collectively form a "game engine" of the game system 300. The electronic game includes at least the game system 300 and may additionally include data stored at the secondary memory 218 in some embodiments.

The game system 300 performs operations 310A through 310N (collectively referred to as "the operations 310") to run gameplay sessions of the electronic game, including the destruction of game objects. Specifically, the game system 300 performs these operations 310 to instantiate game objects in the gameplay session, render various instantiated game objects within the gameplay session (e.g., the user's game character and game objects in a particular direction or field of view from the game character), and simulate interactions between the game objects. The operations 310 refer to computing operations that result in changes in various parameters (e.g., states of game objects and user status) based upon certain events (e.g., user interactions, expirations of time, and triggers occurring in the gameplay session).

Some operations 310 are associated with the destruction of one or more game objects. Examples of operations associated with the destruction of a game object may include animations of movement of the game object or interactions of the game object with another game object. A particular example of movement of the game object may include a piece of armor falling to the ground. A particular example of an interaction of the game object with another game object may include the piece of fallen armor being kicked by another character along the ground. The operations 310 may be simulated by the game engine. When executing the operations 310, the game system 300 may communicate with the components of the game engine (e.g., the destruction manager 320, the physics system 325, the effects system 330, etc.) through application programming interfaces (APIs). At least one of the operations 310 associated with the destruction of a game object involves determining a level of destructive detail.

The level manager 340 creates and maintains gameplay sessions using game objects it retrieves from the primary memory 216 or secondary memory 218. For example, upon the game system 300 launching a gameplay session, the game system 300 determines which game objects are or could be involved in the gameplay session, and loads them into primary memory 216, e.g., at the level manager 340. Other modules of the game system 300 can request one or more game objects from the level manager 340, which responds to the requests by sending the game objects to the module of the game system 300 that sent the request. The level manager 340 may also receive input from the user interface 222, the operations 310, or other modules of the game system 300, which may impact a game session, e.g., instruct the level manager 340 to destroy a game object.

The destruction manager 320 dynamically handles the destruction of game objects within a gameplay session. For example, during gameplay, a game object may experience damage when a destructive action (e.g., being shot, blown up, hit, etc.) occurs upon the game object. As such, the destruction manager 320 may instantiate one or more destruction objects, with a destruction object representing debris caused by the damage to the game object. For example, a suit of armor (a game object) struck with a spear (damage) breaks into multiple pieces of armor (one or more destruction objects). The destruction manager 320 may determine that the game object has been damaged based on one or more operations 310.

Responsive to the determination that a game object has been damaged, the destruction manager 320 determines a level of destructive detail for the resulting destruction object (or objects). The level of destructive detail for a destruction object defines how the destruction object is to be rendered by the game engine after the game object is damaged. In some embodiments, the destruction manager 320 determines either a first level of destructive detail or a second level of destructive detail for the game object. With the first level of destructive detail, a destruction object is to be created utilizing a physics-based configuration (e.g., by the physics system 325). With the second level of destructive detail, the destruction object is to be created utilizing an effects-based configuration (e.g., by the effects system 330).

In one embodiment, the destruction manager 320 determines the level of destructive detail based on one or more properties of the game object that is damaged. In some embodiments, the destruction manager 320 may determine the one or more properties of the game object based on graphics data 372 received from the content source 370 via the level manager 340. The one or more properties of the game object may specify properties of destruction objects that may be created when the game object is damaged, such as a mesh assignment or a gravity assignment for destruction objects. For example, a game designer may have used content creator 110 to assign various destruction objects that may be created when various game objects are damaged. If a destruction object has a mesh defining the destruction object's geometric properties assigned, the destruction manager 320 may determine the level of destructive detail to be the first level of destructive detail and that the destruction object is to be created as a physics object where the mesh is used to determine interactions with other objects in the environment. Alternatively, if the destruction object does not have a mesh assigned, the destruction manager 320 may determine the level of destructive detail to be the second level of destructive detail and that the destruction object is to be created as an effects object because, without a mesh, the physics system 325 may not have a mechanism for determining interactions between the destruction object and other objects in the environment.

In another example, a destruction object has a gravity assigned defining the destruction object's interactivity with gravity, When the destruction object is created due to damage to a game object, the destruction manager 320 may determine the level of destructive detail to be the first level of destructive detail and that the destruction object is to be created as a physics object where the gravity assignment is used to model how the destruction object falls, bounces, etc. in the environment. Alternatively, if the destruction object does not have a gravity assigned, the destruction manager 320 may determine the level of destructive detail to be the second level of destructive detail and that the destruction object is to be created as an effects object because, without a gravity, the physics system 325 may not have a mechanism for determining interactions between the destruction object and gravity in the environment.

The destruction manager 320 may determine the level of destructive detail based on one or more properties of the client device 130. The one or more properties of the client device 130 correspond to specifications of the client device 130 and current operating characteristics of the client device 130. The one or more properties of the client device 130 may include a type of client device 130 (e.g., system or platform of the client device 130), a type of OS 360 (e.g., Windows 10, Windows 8, macOS, Linux, etc.), a type of processor 212 (e.g., Intel Core i5, Intel Core i7, AMD Ryzen 5, AMD Ryzen 7, etc.), a current processor usage percentage (e.g., high CPU usage, low CPU usage, 80% CPU usage, 40% CPU usage, etc.), a type of memory (e.g., storage capacity of primary memory 216), an amount of currently available memory (e.g., available storage capacity in primary memory 216), an amount of memory currently being used (e.g., unavailable storage capacity in primary memory 216). In one example, if the type of OS 360 is Windows 10, the destruction manager 320 may determine the level of destructive detail to be the first level of destructive detail. In some embodiments, the destruction manager 320 may compare any or all of the one or more properties of the client device 130 to a threshold to determine the level of destructive detail. For example, if the current processor usage percentage is above a first threshold and the amount of currently available memory is below a second threshold, the destruction manager 320 may determine the level of destructive detail to be the second level of destructive detail.

The destruction manager 320 may determine the level of destructive detail based on one or more properties of the gameplay session. The one or more properties of the gameplay session correspond to characteristics of the game. The one or more properties of the gameplay session may include a type of game (e.g., genre of game), a type of scene (e.g., action intense scene, non-action intense scene), a number of game objects in the scene, and a frame rate of the scene. In an example, if the type of scene is an action-intense scene, the destruction manager 320 may determine the level of destructive detail to be the second level of destructive detail. In some embodiments, the destruction manager 320 may compare any or all of the one or more properties of the gameplay session to a threshold to determine the level of destructive detail. In an example, if the frame rate of the scene is below a threshold, the destruction manager 320 may determine the level of destructive detail to be the first level of destructive detail.

The destruction manager 320 may determine the level of destructive detail based on one or more settings provided by the user of the client device 130. The one or more settings may be provided by the user via the user interface 222. The one or more settings may include a preferred level of destructive detail. In some embodiments, the one or more settings may include a setting that specifies the client device 130 is to determine the appropriate level destructive detail in real-time. In an example, if the user selected a preferred level of destructive detail to be the second level of destructive detail, the destruction manager 320 may determine the level of destructive detail to be the second level of destructive detail.

The destruction manager 320 may determine the level of destructive detail based on a combination of the one or more properties of the game object, one or more properties of the client device 130, one or more properties of the gameplay session, or one or more settings provided by the user. For example, if a destruction object resulting from damage to the game object is assigned a mesh and the OS 360 is a Windows 10, the destruction manager 320 may determine the level of destructive detail to be the first level of destructive detail. In another example, the destruction manager 320 may determine the level of destructive detail by determining a metric that indicates an available amount of computing resources available at a time the game object is damaged. The metric is based on one or more properties of the client device 130 and one or more properties of the gameplay session. For example, the metric is based on at least one of a current processor usage percentage, an amount of currently available memory, or a current frame rate. A metric is higher when the current processor usage percentage is low, the amount of currently available memory is high, or a current frame rate is low. The destruction manager 320 may compare the metric to a threshold metric. Based on the metric being greater than the threshold metric, the destruction manager 320 may select the first level of destructive detail.

Additionally, or alternatively, in some embodiments, the destruction manager 320 may determine an amount of other game objects being rendered with a physics-based configuration during the gameplay session. The destruction manager 320 may compare the amount of other game objects to a threshold amount. The threshold amount may be based on one or more properties of the client device 130. For example, a high CPU usage amount of the processor 212 correlates with a lower threshold amount. Based on the amount of other game objects (that are renders with a physics-based configuration) being greater than the threshold amount, the destruction manager 320 may determine to update the level of destructive detail for the game object to the second level of destructive detail. By tracking the amount of other game objects being rendered with a physics-based configuration during the gameplay session, the destruction manager 320 can better account for changes in computing resources used by the game system 300 and thereby reduce performance issues.

After the destruction manager 320 determines the level of destructive detail for the game object, the destruction manager 320 provides instructions to the physics system 325 or to the effects system 330 to create the destruction object(s) based on the determined level of destructive detail. For the first level of destructive detail, instructions are provided to the physics system 325. For the second level of destructive detail, instructions are provided to the effects system 330.

The physics system 325 creates one or more destruction object(s) and simulates the dynamics of the destruction object(s) in the gameplay session. For example, the physics system 325 models how a piece of armor (a destruction object) falls to the ground after the suit of armor (the game object) is damaged. The physics system 325 may model the destruction object as a rigid body. During the gameplay session, one or more other game objects may be rendered by the graphics rendering module 355. The physics system 325 may model interactions between destruction object(s) and other game objects. For example, the piece of armor may be kicked along the ground by another character (another game object). The physics system 325 may model the dynamics necessary to simulate this interaction.

The effects system 330 creates one or more destruction object(s) and determines predetermined behavior of the destruction object(s) in the gameplay session. In the same piece of armor example described above, the effects system 330 models the piece of armor falling to the ground via a parabolic path and then sticking to the ground or disappearing completely at ground level. In some embodiments, the effects system 330 may model the destruction object as a conventional sprite or non-solid 3D object. The effects system 330 ignores other game objects potentially rendered by the graphics rendering module 355. For example, if a character bumps into the piece of armor when modelled as an effect, the character passes through the piece of armor.

The sound module 345 generates sounds corresponding to actions occurring in the gameplay session. For example, the destruction of a "building" game object may correspond to an "explosion" sound. Animation data from the animation system 350 or gameplay session information from the level manager 340 may be sent to the sound module 345 to enable the sound module 345 to produce sound. The sound module 345 sends sound data to the sound controller 224.

The animation system 350 is a module that performs kinematic animation of game objects in the gameplay session based on the operations 310 from the game system 300. For example, if an operation 310 specifies that a robotic arm is moving, the animation system 350 animates the kinematics of the arm movement. As a second example, if an operation 310 specifies that the robotic arm breaks away from a game character, the animation system 350 provides kinematic information (e.g., position, orientation, velocity, angular velocity, etc.) corresponding to the robotic arm to the physics system 325. In this second example, the physics system 325 has a starting point with which to begin its simulations of the robotic arm. The animation system 350 may include any number of specialized modules which perform specific animation tasks.

The graphics rendering module 355 renders graphics from the animation system 350 and level manager 340 to generate an image of the gameplay session. For example, the graphics rendering module 355 receives data from the animation system 350 and a game object from the level manager 340. In another example, the graphics rendering module 355 receives data from the physics system 325. The graphics rendering module 355 sends graphical data to the GPU 214 to render images on a display, e.g., a display of the client device 130 or a display connected to the client device 130, via the display controller 220.

The OS 360 manages computer hardware and software resources. Specifically, the OS 360 acts as an intermediary between programs and the computer hardware. For example, the OS 360 can perform basic tasks, such as recognizing input from the user interface 222 and sending output to the display controller 220.

The content source 370 in the secondary memory 218 includes various data, including graphics data 372, audio data 374, event data 376, and object data 378. Depending upon the embodiment, some or all of the data in the content source 370 may instead be in the primary memory 216. The content source 370 sends data to the level manager 340 upon receiving a request for the data from the level manager 340. For example, upon the level manager 340 receiving a request for information regarding graphics data from the destruction manager 320, the level manager 340 requests the information from the content source 370, which sends the information to the level manager 340.

The graphics data 372 includes graphics data, e.g., mesh assignments and gravity assignments, for one or more game objects or destruction objects.

The audio data 374 includes data relating to sound, e.g., clips of sound. Each portion of audio data 374 may be associated with one or more game objects. The sound module 345 may retrieve audio data 374 and use it to generate sounds corresponding to actions occurring in the gameplay session, such as the destruction of a game object.

The event data 376 includes game events, which occur during the gameplay session. Each game event may be associated with a destruction operation for one or more game objects. A destruction operation may be triggered by the occurrence of an associated game event in the gameplay session.

The object data 378 includes game objects. Each game object may include a variety of information depending upon the embodiment. This may include an identifier used to associate a game object with a mesh assignment or a gravity assignment. In an embodiment, the object data 378 includes the graphics data 372.

FIG. 4 is a flowchart illustrating a process 400 for providing dynamic destruction of a game object, according to an embodiment. During a gameplay session, the client device 130 determines 410 that the game object has been damaged. For example, the client device 130 may determine a game object has been damaged based in part on information received from the level manager 340.

Responsive to the client device 130 determining the game object has been damaged, the client device 130 determines 420 a level of destructive detail. In some embodiments, the client device 130 determines the level of destructive detail based on one or more properties of the game object, one or more properties of the client device 130, one or more properties of the gameplay session, or one or more settings provided by a user of the client device 130. The properties of the game object may include a mesh assignment or a gravity assignment. The properties of the client device 130 may include a type of client device 130, a type of operating system 360, a type of processor, a current processor usage percentage, a type of memory, an amount of currently available memory, and an amount of memory currently being used. The properties of the gameplay session may include a type of game, a type of scene, a number of game objects in the scene, and a frame rate of the scene. The settings provided by the user of the client device 130 may include a user-preferred level of destructive detail. In some embodiments, the client device 130 may determine the level of destructive detail based on comparisons of some of the properties with threshold values. For example, the amount of memory currently being used may be compared with a threshold and based on the comparison the client device 130 may determine the level of destructive detail.

The client device 130 creates 430 a destruction object having the determined level of destructive detail. In some embodiments, the determined level of destructive detail may be one of two possible levels. A first level of destructive detail defines a physics-based configuration of the destruction object and the second level of destructive detail defines an effects-based configuration of the destruction object.

The client device 130 renders 440 a graphical indication of the damage of the game object using the destruction object.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Although embodiments described above are explained primarily in reference to a game system, the embodiments may be applied to other applications such as engineering software, navigational software, and educational software, such as a map application or a ride hailing application. Additionally, embodiments can be applied to research applications.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for providing dynamic destruction of a game object, the method comprising:
    determining, during a gameplay session, that the game object has been damaged;
    responsive to determining the game object has been damaged, selecting a level of destructive detail for a destruction object from a plurality of levels, the plurality of levels comprising:
        a first level of destructive detail resulting in physics-based behavior of the destruction object; and
        a second level of destructive detail resulting in effects-based behavior of the destruction object;
    creating the destruction object having the selected level of destructive detail;
    modeling behavior of the destruction object, wherein the modeling uses a physics-based model responsive to selection of the first level of destructive detail or an effects-based model responsive to selection of the second level of destructive detail; and
    rendering, using the modeled behavior of the destruction object, a graphical indication of the damage of the game object.

2. The method of claim 1, wherein the level of destructive detail is based on one or more properties of the game object, the one or more properties of the game object including an indication, for the destruction object, of a mesh assignment or a gravity assignment.

3. The method of claim 1, wherein the method is performed by a client device, and wherein the level of destructive detail is based on one or more properties of the client device, the one or more properties of the client device including a type of client device, a type of operating system, a type of processor, a current processor usage percentage, a type of memory, an amount of currently available memory, or an amount of memory currently being used.

4. The method of claim 1, wherein the level of destructive detail is based on one or more properties of the gameplay session, the one or more properties of the gameplay session including a type of game, a type of scene, a number of game objects in the scene, or a frame rate of the scene.

5. The method of claim 1, wherein the method is performed by a client device, and wherein the level of destructive detail is based on one or more settings provided by a user of the client device.

6. The method of claim 1, the method further comprising:
    rendering, during the gameplay session, a plurality of other game objects;
    determining an amount of the plurality of other game objects that are being rendered with the first level of destructive detail;
    comparing the amount of the plurality of other game objects to a threshold amount; and
    based on the amount of the plurality of other game objects being greater than the threshold amount, determining to update the level of destructive detail to the second level of destructive detail.

7. The method of claim 1, wherein the destruction object represents debris caused by damage to the game object, and the method further comprising:
    rendering, during the gameplay session, one or more other game objects, and
    wherein the level of destructive detail for the destruction object determines whether an interaction takes place between the destruction object and the one or more other game objects.

8. The method of claim 7, wherein the first level of destructive detail for the destruction object provides for an interaction between the destruction object and any of the one or more other game objects, and wherein the second level of destructive detail for the destruction object does not provide for an interaction with any of the one or more other game objects.

9. The method of claim 1, wherein determining the level of destructive detail comprises:
    determining, at a time the game object is damaged, a metric indicating an available amount of computing resources, the metric based on at least one of a current processor usage percentage, an amount of currently available memory, or a current frame rate;
    comparing the metric to a threshold metric; and
    based on the metric being greater than the threshold metric, selecting the first level of destructive detail.

10. A non-transitory computer-readable storage medium storing instructions that, when executed by a computing system, cause the computing system to perform operations comprising:
    determining, during a gameplay session, that the game object has been damaged;
    responsive to determining the game object has been damaged, selecting a level of destructive detail for a destruction object from a plurality of levels, the plurality of levels comprising:
        a first level of destructive detail resulting in physics-based behavior of the destruction object; and
        a second level of destructive detail resulting in effects-based behavior of the destruction object;

creating the destruction object having the selected level of destructive detail;

modeling behavior of the destruction object, wherein the modeling uses a physics-based model responsive to selection of the first level of destructive detail or an effects-based model responsive to selection of the second level of destructive detail; and rendering, using the modeled behavior of the destruction object, a graphical indication of the damage of the game object.

11. The non-transitory computer-readable storage medium of claim 10, wherein the level of destructive detail is based on one or more properties of the game object, the one or more properties of the game object including an indication, for the destruction object, of a mesh assignment or a gravity assignment.

12. The non-transitory computer-readable storage medium of claim 10, wherein the level of destructive detail is based on one or more properties of a client device of the computing system, the one or more properties of the client device including a type of client device, a type of operating system, a type of processor, a current processor usage percentage, a type of memory, an amount of currently available memory, or an amount of memory currently being used.

13. The non-transitory computer-readable storage medium of claim 10, wherein the level of destructive detail is based on one or more properties of the gameplay session, the one or more properties of the gameplay session including a type of game, a type of scene, a number of game objects in the scene, and a frame rate of the scene.

14. The non-transitory computer-readable storage medium of claim 10, wherein the level of destructive detail is based on one or more settings provided by a user of the computing system.

15. The non-transitory computer-readable storage medium of claim 10, the operations further comprising:

rendering, during the gameplay session, a plurality of other game objects;

determining an amount of the plurality of other game objects that are being rendered with the first level of destructive detail;

comparing the amount of the plurality of other game objects to a threshold amount; and based on the amount of the plurality of other game objects being greater than the threshold amount, determining to update the level of destructive detail to the second level of destructive detail.

16. The non-transitory computer-readable storage medium of claim 10, wherein the destruction object represents debris caused by damage to the game object, and wherein the operations further comprise:

rendering, during the gameplay session, one or more other game objects, and wherein the level of destructive detail for the destruction object determines whether an interaction takes place between the destruction object and the one or more other game objects.

17. The non-transitory computer-readable storage medium of claim 16, wherein the first level of destructive detail for the destruction object provides for an interaction between the destruction object and any of the one or more other game objects, and wherein the second level of destructive detail for the destruction object does not provide for an interaction with any of the one or more other game objects.

18. The non-transitory computer-readable storage medium of claim 10, wherein determining the level of destructive detail comprises:

determining, at a time the game object is damaged, a metric indicating an available amount of computing resources, the metric based on at least one of a current processor usage percentage, an amount of currently available memory, or a current frame rate;

comparing the metric to a threshold metric; and based on the metric being greater than the threshold metric, selecting the first level of destructive detail.

* * * * *